United States Patent
Ono et al.

(10) Patent No.: US 11,214,166 B2
(45) Date of Patent: Jan. 4, 2022

(54) CHARGE CONTROL SYSTEM FOR VEHICLE

(71) Applicant: TOYOTA JIDOSHA KABUSHIKI KAISHA, Toyota (JP)

(72) Inventors: Tomohito Ono, Susono (JP); Terufumi Miyazaki, Toyota (JP); Yosuke Suzuki, Hadano (JP); Hiroto Hashimoto, Atsugi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 177 days.

(21) Appl. No.: 16/596,044

(22) Filed: Oct. 8, 2019

(65) Prior Publication Data

US 2020/0139841 A1 May 7, 2020

(30) Foreign Application Priority Data

Nov. 2, 2018 (JP) .............................. JP2018-207669

(51) Int. Cl.
| | |
|---|---|
| *B60L 53/66* | (2019.01) |
| *B60L 50/61* | (2019.01) |
| *B60L 50/10* | (2019.01) |
| *B60L 53/16* | (2019.01) |
| *B60L 53/18* | (2019.01) |
| *B60K 35/00* | (2006.01) |

(52) U.S. Cl.
CPC .............. *B60L 53/66* (2019.02); *B60K 35/00* (2013.01); *B60L 50/10* (2019.02); *B60L 50/61* (2019.02); *B60L 53/16* (2019.02); *B60L 53/18* (2019.02); *B60K 2370/152* (2019.05); *B60K 2370/167* (2019.05); *B60L 2250/16* (2013.01); *B60L 2250/22* (2013.01)

(58) Field of Classification Search
CPC ........... B60L 53/66; B60L 50/61; B60L 53/16
USPC ......................................................... 320/109
See application file for complete search history.

(56) References Cited

U.S. PATENT DOCUMENTS

| 2013/0175990 A1* | 7/2013 | Jung | .......................... H02J 7/02 |
| | | | 320/109 |
| 2013/0293201 A1* | 11/2013 | Ono | ...................... B60W 20/00 |
| | | | 320/138 |

(Continued)

FOREIGN PATENT DOCUMENTS

| EP | 2 641 772 A1 | 9/2013 |
| JP | 988656 A | 3/1997 |
| JP | 11-178109 A | 7/1999 |

(Continued)

*Primary Examiner* — Suchin Parihar
(74) *Attorney, Agent, or Firm* — Sughrue Mion, PLLC (57) ABSTRACT

A charge control system for a vehicle, which is configured to control charging of a power storage device, includes a user detector that determines whether a user is present within a predetermined range relative to the vehicle, and a vehicle electronic control unit configured to permit the power storage device to be charged with electric power generated by the generator, in addition to the power from the outside of the vehicle, during external charging, when the user detector determines that the user is present within the predetermined range. The vehicle ECU is configured to inhibit power generation by the generator during external charging when the user detector determines that the user is not present within the predetermined range.

11 Claims, 3 Drawing Sheets

(56) References Cited

U.S. PATENT DOCUMENTS

2020/0055420 A1* 2/2020 Peer .................. B60L 53/66
2021/0094438 A1* 4/2021 Ciccone ............. F02D 41/26

FOREIGN PATENT DOCUMENTS

| JP | 5661121 B2 | 12/2014 |
| JP | 2015040011 A | 3/2015 |
| WO | 2015025199 A2 | 2/2015 |

* cited by examiner

CHARGE CONTROL SYSTEM FOR VEHICLE

INCORPORATION BY REFERENCE

The disclosure of Japanese Patent Application No. 2018-207669 filed on Nov. 2, 2018 including the specification, drawings and abstract is incorporated herein by reference in its entirety.

BACKGROUND

1. Technical Field

The disclosure relates to a charge control system for a vehicle.

2. Description of Related Art

In a vehicle disclosed in Japanese Patent No. 5661121 (JP 5661121 B), during external charging, namely, while a vehicle battery is being charged from the outside of the vehicle, the battery can be charged with both electric power from an external power supply, and electric power generated by a motor-generator for power generation by driving an engine.

SUMMARY

However, in the vehicle disclosed in JP 5661121 B, there is some room for further study in the manner of taking action at the time of emergency and managing the safety of the vehicle when the internal combustion engine is driven during external charging so as to cause the generator to generate electric power.

The disclosure provides a charge control system for a vehicle, which makes it possible to take action at the time of emergency and manage the safety of the vehicle when an internal combustion engine is driven during external charging so as to cause a generator to generate electric power.

One aspect of the disclosure is concerned with a charge control system for a vehicle, which is configured to control charging of a power storage device of the vehicle. The power storage device is adapted to be externally charged with electric power from an outside of the vehicle, and adapted to be charged with electric power generated by a generator that is driven with driving force from an internal combustion engine. The charge control system includes a user detector configured to determine whether a user is present within a predetermined range relative to the vehicle, and a vehicle electronic control unit configured to permit the power storage device to be charged with electric power generated by the generator, in addition to the electric power from the outside of the vehicle, during external charging, when the user detector determines that the user is present within the predetermined range. The vehicle electronic control unit is configured to inhibit power generation by the generator during external charging when the user detector determines that the user is not present within the predetermined range.

In the charge control system according to the above aspect, the predetermined range may be a range that surrounds a periphery of a driver seat of the vehicle.

In the charge control system according to the above aspect, the predetermined range may be an interior of the vehicle.

With the above configuration, since the user is present inside the vehicle, the user is able to take action at the time of emergency and manage the safety of the vehicle when add-on charging is performed during external charging.

In the charge control system according to the above aspect, the predetermined range may be a range in which wireless communications between the vehicle and a communication device carried by the user are possible.

With the above configuration, the charge control system can inform the communication device carried by the user of occurrence of an abnormality in the vehicle during external charging. Thus, the user is notified of the abnormality in the vehicle, and is able to take action at the time of emergency and manage the safety of the vehicle when add-on charging is performed during external charging.

In the charge control system according to the above aspect, whether electric power is generated by the generator during external charging may be selectable by the user.

With the above configuration, the user can select whether the charging time is to be reduced, or the fuel consumption is to be reduced.

In the charge control system according to the above aspect, an amount of electric power generated by the generator during external charging may be selectable by the user.

With the above configuration, the user can select the charging time or the fuel efficiency.

In the charge control system according to the above aspect, the vehicle electronic control unit may permit the generator to generate electric power during external charging, when a remaining amount of fuel for driving the internal combustion engine in the vehicle is equal to or larger than a predetermined amount.

With the above configuration, the fuel consumption can be controlled so as to assure the predetermined amount of fuel.

In the charge control system according to the above aspect, whether power generation by the generator during external charging is continued or finished may be selectable by the user.

With the above configuration, the user can select reduction of the charging time or reduction of the fuel consumption.

The charge control system according to the above aspect may further include a display device that indicates that the internal combustion engine is being driven during external charging.

With the above configuration, the user, etc. can be informed that the internal combustion engine is being driven during external charging.

In the charge control system according to the above aspect, the vehicle electronic control unit may permit an accessory power supply to be turned on during external charging.

With the above configuration, air-conditioning equipment, audio equipment, and the like, can be used during charging, so as to make the user located inside the vehicle feel more comfortable.

In the charge control system according to the above aspect, the vehicle electronic control unit may permit the generator to generate electric power during external charging while an ignition power supply of the vehicle is in an OFF state.

With the above configuration, the internal combustion engine is not driven except when add-on charging is performed during external charging; therefore, the fuel consumption can be reduced, and unintentional driving of the internal combustion engine can be curbed.

The charge control system for the vehicle according to the above aspect can drive the internal combustion engine and cause the generator to generate electric power during external charging, only when the user is present within the predetermined range relative to the vehicle, namely, under a situation where the user can take action in response to an abnormality that occurs in the vehicle. Thus, the user who is present within the predetermined range can take action at the time of emergency and manage the safety of the vehicle, when the internal combustion engine is driven so as to cause the generator to generate electric power, during external charging.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

A charge control system for a vehicle according to one embodiment of the disclosure will be described. The disclosure is not limited to this embodiment.

Figure 1:
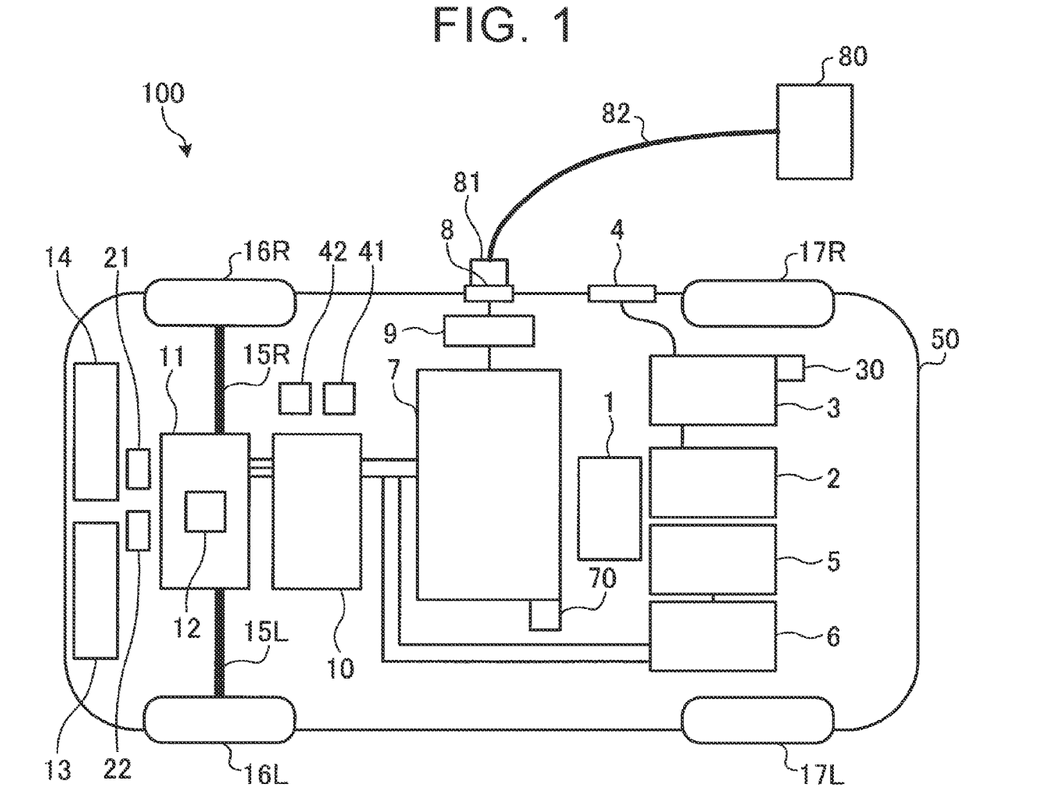
FIG. 1 is a schematic view showing the configuration of a principal part of a vehicle according to one embodiment.

FIG. 1 schematically shows the configuration of a principal part of a vehicle 100 according to the embodiment. As shown in FIG. 1, the vehicle 100 according to this embodiment includes a vehicle electronic control unit (ECU) 1 as a controller, engine 2 as an internal combustion engine, fuel tank 3, fuel filler port 4, motor-generator 5 for power generation, as a generator, inverter 6 for power generation, power storage device 7, connecting part 8, charging device 9, power control unit (PCU) 10, transaxle 11, motor-generator 12 for driving, radiator 13 for engine, radiator 14 for electric system, drive shafts 15L, 15R, front wheels 16L, 16R as driving wheels, rear wheels 17L, 17R as non-driving wheels, air-conditioning equipment 21, audio equipment 22, fuel remaining amount detection sensor 30, user detector 41, interface (which will also be called "I/F") unit 42, and SOC detection sensor 70. Reference numeral 50 in FIG. 1 is an outline of the vehicle 100, which delimits a boundary between the interior and exterior of the vehicle 100.

The power storage device 7 is an electric power storage element configured to be charged with electric power or discharge power. The power storage device 7 includes a secondary battery, such as a lithium-ion battery, nickel hydride battery, or lead storage battery, or a power storage element, such as an electric double layer capacitor.

The power storage device 7 is connected to the PCU 10 via a power line, for example. The power storage device 7 supplies the PCU 10 with electric power for generating driving force in the vehicle 100. Also, the power storage device 7 stores electric power generated by the motor-generator 5 for power generation. The output of the power storage device 7 is, for example, about 200 V.

The PCU 10 has a converter (not shown), an inverter (not shown), and so forth. The converter of the PCU 10 performs voltage conversion on electric power supplied from the power storage device 7 to the PCU 10, based on a control signal from the vehicle ECU 1. The inverter of the PCU 10 converts direct-current (DC) power supplied from the converter, into alternating-current (AC) power, based on a control signal from the vehicle ECU 1, and supplies the AC power to the motor-generator 12 for driving, which is provided in the transaxle 11, so as to drive the motor-generator 12 for driving.

The motor-generator 5 for power generation and the motor-generator 12 for driving are alternating-current rotating electric machines. For example, each of the motor-generators 5, 12 is a permanent magnet type synchronous rotating electric machine having a rotor in which permanent magnets are embedded.

Output torque of the motor-generator 12 for driving is transmitted to the front wheels 16R, 16L, via a power transmission mechanism (not shown) provided in the transaxle 11 and the drive shafts 15R, 15L, so as to propel the vehicle 100. When the vehicle 100 performs regenerative braking operation, the motor-generator 12 for driving can generate electric power, using rotary power of the front wheels 16R, 16L. The power generated by the motor-generator 12 for driving is then converted into charging power via the PCU 10, and supplied to the power storage device 7.

The motor-generator 5 for power generation is connected to the engine 2 via a power transmission mechanism (not shown), and is able to generate electric power when it is driven with driving force from the engine 2. The engine 2 is driven with fuel, such as gasoline, supplied from the fuel tank 3. To replenish the fuel tank 3 with the fuel, a fueling nozzle provided in refueling equipment (not shown) is inserted into the fuel filler port 4, and the fuel is fed from the refueling equipment into a fuel pipe via the fueling nozzle, fuel filler port 4, etc. The amount of fuel remaining in the fuel tank 3 is detected by the fuel remaining amount detection sensor 30 provided in the fuel tank 3, and the result of detection is transmitted as a control signal to the vehicle ECU 1.

Electric power generated by the motor-generator 5 for power generation is converted into charging power by means of the inverter 6 for power generation, and supplied to the power storage device 7, so that the power storage device 7 is charged with the power. In this embodiment, the motor-generator 12 for driving is used exclusively as an electric motor for driving the front wheels 16R, 16L, and the motor-generator 5 for power generation is used exclusively as a generator driven by the engine 2. Namely, in this embodiment, the engine 2 and the motor-generator 5 for power generation constitute a power generation unit.

While the vehicle 100 is equipped with two motor-generators in the embodiment of FIG. 1, the number of motor-generators is not limited to this, but may be any value provided that the vehicle includes a motor-generator capable of generating electric power by use of the engine 2.

The radiator 13 for engine constitutes a coolant circulation system in which coolant for cooling the engine 2 passes through a cooling pipe and circulates. The radiator 14 for electric system constitutes a coolant circulation system in which coolant for cooling an electric system, including the motor-generator 5 for power generation, inverter 6 for power generation, power storage device 7, charging device 9, PCU 10, and motor-generator 12 for driving, is circulated.

The I/F unit 42 serves as an interface between the user and the vehicle ECU 1. Although not illustrated in the drawings, the I/F unit 42 has an input part for receiving a command from the user, a display part for displaying conditions of each part of devices and warnings to the user, and so forth. The I/F unit 42 transmits an operation signal entered by the user via the input part, to the vehicle ECU 1. Also, the I/F unit 42 displays a content to be presented to the user, on the display part, based on a display signal from the vehicle ECU 1.

The vehicle ECU 1 has a central processing unit (CPU), storage device, and so forth, which are not illustrated in FIG. 1. The vehicle ECU 1 receives a signal from each sensor, etc. provided in the vehicle 100, outputs a control signal to each device, and controls the vehicle 100 and each device. The control is not limited to processing by software, but may be implemented by a dedicated hardware (electronic circuit). The vehicle ECU 1 computes the state of charge (SOC) of the power storage device 7, based on detection values of voltage and current from the SOC detection sensor 70 provided in the power storage device 7. The vehicle ECU 1 creates control signals for controlling the engine 2, PCU 10, and so forth, and outputs the signals.

The vehicle 100 has the connecting part 8, charging device 9, etc., as an arrangement for charging the power storage device 7 with electric power from the external power supply 80. The charging device 9 is connected to the power storage device 7 and the connecting part 8 via respective power lines, or the like. A charging connector 81 of a charging cable 82 provided on the external power supply 80 is connected to the connecting part 8. In operation, electric power is transmitted from the external power supply 80 to the charging device 9 through the charging cable 82, via the charging connector 81 and the connecting part 8. The charging device 9 is controlled according to a control signal from the vehicle ECU 1, so as to convert alternating-current (AC) power supplied from the external power supply 80 via the connecting part 8 into charging power, and supply the power to the power storage device 7, to charge the power storage device 7. In this embodiment, charging the power storage device 7 with electric power supplied from the external power supply 80 located outside the vehicle is referred to as "external charging". Also, the method of external charging, or charging the power storage device 7 from outside the vehicle, is not limited to contact charging where the connecting part 8 of the vehicle 100 is in contact with the charging connector 81 of the external power supply 80, but may be non-contact charging using an electromagnetic induction method or a resonance method.

While one control unit is provided as the vehicle ECU 1 in the vehicle 100 according to the embodiment, individual control units, such as a control unit for the engine 2 and a control unit for the PCU 10, may be provided for respective functions or devices to be controlled. Also, in the vehicle 100 according to the embodiment, the power storage device 7 can be charged with electric power, through external charging, and charging with power generated by the motor-generator 5 for power generation, which is driven with driving force from the engine 2. The charging of the power storage device 7 is controlled by the vehicle ECU 1 that functions as a charge control device.

In the vehicle 100 according to the embodiment, the motor-generator 12 for driving is driven using only electric power from the power storage device 7, so as to propel the vehicle 100. Thus, when there is a relatively long distance between a start point to a target point, for example, the power storage device 7 may be desired to be brought into a fully charged state, immediately before starting. In this case, the user may wish to bring the power storage device 7 into the fully charged state in a short period of time. In this embodiment, the fully charged state of the power storage device 7 is not limited to the case where the SOC of the power storage device 7 is 100%. For example, the power storage device 7 may be regarded as being in the fully charged state when the SOC of the power storage device 7 reaches a preset given SOC, for example, when it is equal to or greater than 90% or 95%.

Thus, in the vehicle 100 according to this embodiment, during external charging of the power storage device 7 with electric power from the external power supply 80, the power storage device 7 may also be charged with electric power generated by the motor-generator 5 for power generation by driving the engine 2. This type of charging will be called "add-on charging". In this manner, the power storage device 7 can be charged with electric power from the external power supply 80, and electric power from the motor-generator 5 for power generation, and the power storage device 7 can be brought into the fully charged state in a shorter time than that in the case where the power storage device 7 is charged solely with electric power from the external power supply 80.

In the meantime, during external charging, the vehicle 100 is parked in a parking space in the vicinity of the external power supply 80; therefore, the user, as an occupant, such as a driver, of the vehicle 100, may not be present in the interior of the vehicle 100 during external charging. Thus, when the engine 2 is driven, so as to perform add-on charging during external charging, the user may not be able to take action at the time of emergency and manage the safety of the vehicle 100 when an abnormality occurs in the vehicle 100, such as when the rotational speed of the engine 2 becomes excessively high.

The user of the vehicle 100 is not limited to an occupant, such as a driver, of the vehicle 100, but may include a worker who does maintenance work on the vehicle 100, or a staff member who stays at an outside charging facility where the external power supply 80 is installed.

Thus, in the vehicle 100 according to the embodiment, the vehicle ECU 1 performs charge control, so as to enable add-on charging during external charging, under a situation where the user can take action at the time of emergency and manage the safety of the vehicle 100.

Figure 2:
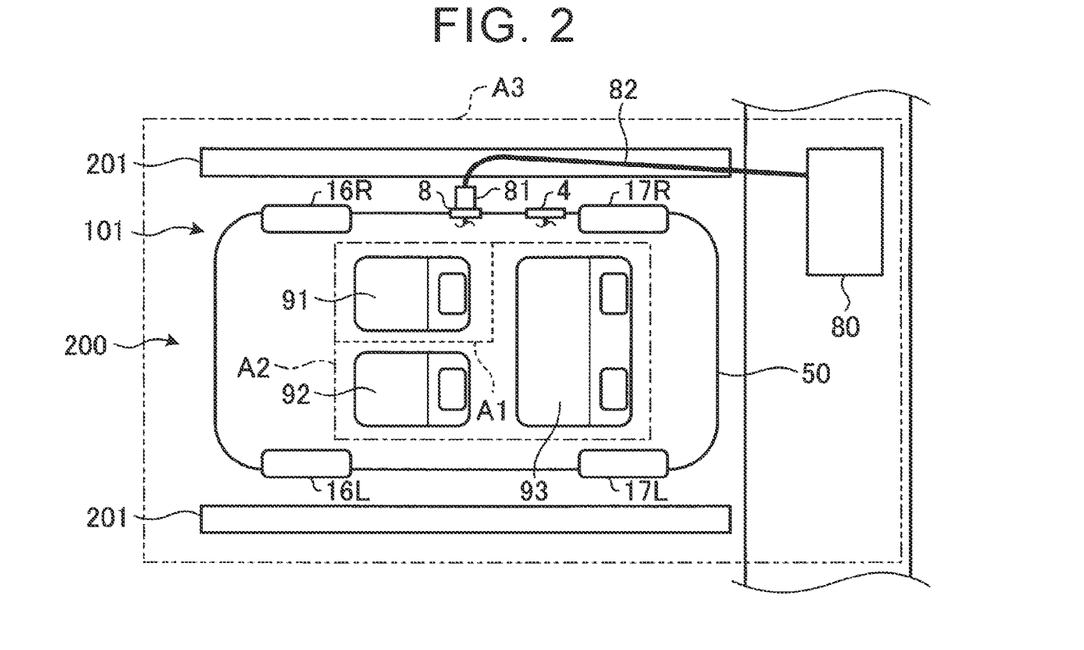
FIG. 2 is a view showing examples of ranges of the position of a user relative to the vehicle, in which add-on charging can be performed during external charging.

FIG. 2 shows examples of ranges of the position of the user relative to the vehicle 100, in which add-on charging can be performed during external charging. In FIG. 2, the power storage device 7 is externally charged with electric power from the external power supply 80, in a condition where the vehicle 100 is parked in a parking space 200 delimited by a pair of white lines 201.

In the vehicle 100 according to the embodiment, the vehicle ECU 1 determines whether add-on charging can be performed during external charging, depending on whether the user of the vehicle 100 is present within a range surrounding the periphery of a driver seat 91 provided in a cabin of the vehicle 100, namely, in an area A1 defined by a broken line in FIG. 2, for example, during external charging. More specifically, the user detector 41 shown in FIG. 1 is used for determining whether the user is present in the area A1, during external charging. The user detector 41 can detect the user in the area A1, based on various kinds of information, including wearing of a seat belt corresponding to the driver seat 91, image recognition where the driver seat 91 is included in a range of imaging by a camera, history of opening/closing of a door corresponding to the driver seat 91 after stop of the engine, and the history of locking/unlocking of the door corresponding to the driver seat 91, for example. Then, when the user is detected in the area A1 by the user detector 41, the vehicle ECU 1 determines that add-on charging can be performed during external charging. In this manner, the power storage device 7 can be charged by driving the engine 2 and executing add-on charging, during external charging. Even if an abnormality, such as an excessive rise in the rotational speed of the engine 2, occurs in the vehicle 100, when the engine 2 is driven for add-on charging in the middle of external charging, the user, who is present in the area A1, namely, on the driver seat 91, can take action in response to the abnormality.

During external charging, the driver as the user may move from the driver seat 91 to a passenger seat 92, rear seat 93, or the like, and take a break, rather than being seated on the driver seat 91. Also, another user may be seated on the passenger seat 92 or rear seat 93, even if the driver is outside the vehicle, away from the driver seat 91. Thus, in the vehicle 100 according to the embodiment, the vehicle ECU 1 may determine whether add-on charging can be performed during external charging, depending on whether the user of the vehicle 100 is present in the cabin of the vehicle 100 in which the driver seat 91, passenger seat 92, and rear seat 93 are provided, namely, in an area A2 defined by a one-dot chain line in FIG. 2, for example, during external charging.

More specifically, the user detector 41 shown in FIG. 1 is used for determining whether the user is present in the area A2, during external charging. The user detector 41 can detect the user in the area A2, based on various kinds of information, such as wearing of a seat belt corresponding to each of the driver seat 91, passenger seat 92, and rear seat 93, image recognition where the range of imaging by a camera includes the interior of the cabin, history of opening/closing of each door after stop of the engine, and the history of locking/unlocking of each door. Then, when the user is detected in the area A2 by the user detector 41, the vehicle ECU 1 determines that add-on charging can be performed during external charging. It is thus possible to charge the power storage device 7, by executing add-on charging during external charging. Even if an abnormality, such as an excessive rise in the rotational speed of the engine 2, occurs in the vehicle 100, when the engine 2 is driven for add-on charging in the middle of external charging, the user, who is present in the area A2, namely, in the cabin of the vehicle 100, can take action in response to the abnormality.

The range used by the user detector 41 as the interior of the cabin of the vehicle 100 is not limited to the range as shown in FIG. 2, in which the driver seat 91, passenger seat 92, and rear seat 93 are provided. For example, a range including a luggage room provided on the vehicle rear side of the rear seat 93 and spatially connected with the rear seat 93 may be regarded as the interior of the cabin of the vehicle 100, and the user detector 41 may detect the user in this range.

Namely, in the vehicle 100 according to the embodiment, add-on charging can be performed during external charging, when the user is present in the interior (such as area A1 and area A2) of the vehicle 100 as a predetermined range relative to the vehicle 100, under a situation where the user can take action in response to an abnormality in the vehicle 100 which occurs during add-on charging in the middle of external charging. Thus, the user located in the interior of the vehicle 100 can take action at the time of emergency and manage the safety of the vehicle 100 when add-on charging is performed during external charging.

Also, during external charging, the user, such as a driver, may get out of the vehicle, and take a break in the vicinity of the parking space 200 or near the external power supply 80. Thus, in the vehicle 100 according to the embodiment, the vehicle ECU 1 may determine whether add-on charging can be performed during external charging, depending on whether the user of the vehicle 100 is present within a range surrounding the periphery of the vehicle 100 and including a pair of white lines 201 that define the parking space 200 in which the vehicle 100 is parked, and the external power supply 80 that performs external charging on the vehicle 100, namely, within an area A3 defined by a two-dot chain line in FIG. 2, during external charging.

More specifically, the user detector 41 as shown in FIG. 1 determines whether the user is present in the area A3, during external charging. The user detector 41 can detect the user in the area A3, through image recognition where the range of imaging by a camera includes the outer periphery of the vehicle 100, or via wireless communications with a user-side communication device (e.g., a key for the vehicle 100 having a communication function) carried by the user. Then, when the user is detected in the area A3 by the user detector 41, the vehicle ECU 1 determines that add-on charging can be performed during external charging. It is thus possible to charge the power storage device 7 by executing add-on charging during external charging. Even if an abnormality, such as an excessive rise in the rotational speed of the engine 2, occurs in the vehicle 100, when the engine 2 is driven for add-on charging in the middle of external charging, the user can take action in response to the abnormality, since he/she is present in the area A3, namely, close to the vehicle 100 though he/she is outside the vehicle 100.

The range outside the vehicle 100, which is used for detection by the user detector 41, is not limited to the vehicle-outside range close to the vehicle 100, as shown in FIG. 2. Rather, the range outside the vehicle 100 may be determined, such that the user located in the range can notice an abnormality when it occurs in the vehicle 100, and can immediately rush over to the vehicle 100, even if the user is relatively far from the vehicle 100. For example, the range outside the vehicle 100 may be a range in which the user can visually identify or recognize the vehicle 100, or a range (within a circle centered on the vehicle 100 and having a radius of 100 m to 400 m) in which wireless communications can be conducted via the Bluetooth (registered tradename), between a user-side communication device carried by the user, and a vehicle-side communication device, such as the user detector 41, provided in the vehicle 100. As an example of the case where the user is present in the vehicle-outside range as described above, the vehicle 100 is parked in a parking space 200 provided in a rest facility or a commercial facility annexed to an expressway, and the user uses the rest facility or commercial facility, during external charging. Then, when an abnormality occurs in the vehicle 100, during add-on charging in the middle of external charging, the user may visually notice the abnormality in the vehicle 100, or the vehicle-side communication device may inform the user-side communication device of the abnormality so as to cause the user to be aware of the abnormality in the vehicle 100, so that the user can take action in response to the abnormality in the vehicle 100.

When the user-side communication device and the vehicle-side communication device are in wireless communications with each other, the user is only required to be present within the predetermined range. When the wireless communications are cut off, or there are no wireless communications in the first place, it may be determined that the user is not present within the predetermined range.

In the vehicle 100 according to this embodiment, a notification that add-on charging is being performed, or the engine 2 is being driven for add-on charging, may be displayed on a display device (not shown) provided inside the vehicle and/or outside the vehicle, during add-on charging in the middle of external charging. In this manner, the user located inside or outside the vehicle 100 can recognize that add-on charging is being performed during external charging or the engine 2 is being driven. In particular, by displaying a notification that the engine 2 is being driven for add-on charging, toward the outside of the vehicle 100, it is possible to inform a person other than the user of the vehicle 100, of the reason why exhaust gas is emitted from an unoccupied vehicle 100 during external charging, for example.

The amount of electric power that can be generated from the motor-generator 5 for power generation, during add-on charging in the middle of external charging, may be selectable by the user, depending on circumstances, within a range in which the vehicle 100 can meet various restrictions imposed thereon. Thus, the amount of reduction of the charging time of external charging may be selected, according to a request of the driver. The above-mentioned various restrictions include, for example, the temperatures of the motor-generator 5 for power generation, engine 2, and inverter 6 for power generation, which are estimated from the water temperatures of the radiator 13 for engine and the radiator 14 for electric system, and the amount of fuel remaining in the fuel tank 3, for example.

Figure 3:
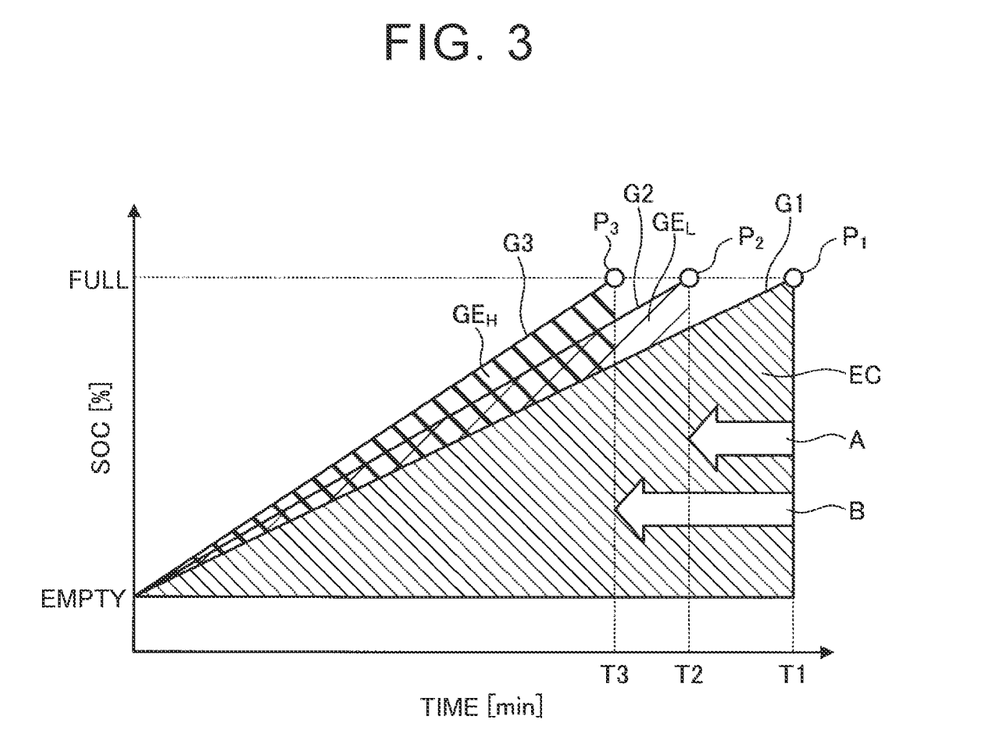
FIG. 3 is a view useful for generally describing charge control according to the embodiment.

FIG. 3 is a view useful for generally describing charge control according to this embodiment. In FIG. 3, the horizontal axis indicates time, and the vertical axis indicates the SOC of the power storage device 7.

The vehicle 100 according to the embodiment is selectively operable in a weak power generation mode and a strong power generation mode, between which the add-on amount of electric power is different. The add-on amount is the amount of electric power from the motor-generator 5 for power generation, which is added during add-on charging in the middle of external charging. The user can select one of the weak power generation mode and the strong power generation mode, via the I/F unit 42. In the strong power generation mode, the rotational speed of the engine 2 is increased to be higher than that in the weak power generation mode, so that the add-on amount of electric power is increased. In this connection, the add-on amount of electric power which can be set during add-on charging in the middle of external charging is not limited to two levels, but may be selected from three or more levels, or may be a single level.

Graph G1 in FIG. 3 illustrates the case where external charging is started from the time when the SOC of the power storage device 7 is an empty state (denoted as "EMPTY" in FIG. 3), and shows change of the SOC when the power storage device 7 is charged solely with electric power from the external power supply 80, until the SOC reaches full charge (denoted as "FULL" in FIG. 3). Region EC in FIG. 3 indicates the amount of electric power from the external power supply 80.

Graph G2 in FIG. 3 illustrates the case where external charging is started from the time when the SOC of the power storage device 7 is the empty state, and shows change of the SOC when the power storage device 7 is charged with both electric power from the external power supply 80, and electric power from the motor-generator 5 for power generation in the weak power generation mode, until the SOC reaches full charge. Region $GE_L$ in FIG. 3 indicates the amount of electric power from the motor-generator 5 for power generation in the weak power generation mode, namely, the add-on amount of power in the weak power generation mode.

Graph G3 in FIG. 3 illustrates the case where external charging is started from the time when the SOC of the power storage device 7 is the empty state, and shows change of the SOC when the power storage device 7 is charged with both electric power from the external power supply 80, and electric power from the motor-generator 5 for power generation in the strong power generation mode, until the SOC reaches full charge. Region $GE_H$ in FIG. 3 indicates the amount of electric power from the motor-generator 5 for power generation in the strong power generation mode, namely, the add-on amount of power in the strong power generation mode.

As shown in FIG. 3, when the power storage device 7 is charged solely with electric power from the external power supply 80 during external charging, the charging time it takes to charge the power storage device 7 from the time when the SOC is the empty state to the time when the SOC is the full state (point P1 on the graph G1 in FIG. 3) is equal to time T1 (min.).

Also, when add-on charging is performed in the weak power generation mode during external charging, the charging time it takes from the time when the SOC is the empty state to the time when the SOC is the full state (point P2 on the graph G2 in FIG. 3) is equal to time T2 (min.), which is shorter than time T1 (min.).

Also, when add-on charging is performed in the strong power generation mode during external charging, the charging time it takes from the time when the SOC is the empty state to the time when the SOC is the full state (point P3 on the graph G3 in FIG. 3) is equal to time T3 (min.), which is shorter than time T2 (min.).

In FIG. 3, arrow A indicates the amount of reduction (time T1-time T2) of the charging time in the case where add-on charging is performed in the weak power generation mode, as compared with the case where the power storage device 7 is charged solely with electric power from the external power supply 80, during external charging. Also, arrow B indicates the amount of reduction (time T1-time T3) of the charging time in the case where add-on charging is performed in the strong power generation mode, as compared with the case where the power storage device 7 is charged solely with electric power from the external power supply 80, during external charging.

As is understood from FIG. 3, in the vehicle 100 according to the embodiment, it is possible to reduce the charging time by performing add-on charging during external charging, as compared with the case where the power storage device 7 is charged solely with electric power from the external power supply 80.

Also, the user selects one of the weak power generation mode and the strong power generation mode, via the I/F unit 42, so that the amount of reduction of the charging time resulting from add-on charging in the middle of external charging can be controlled so as to meet a request of the user.

For example, when the user wishes to reduce the charging time of external charging as much as possible, the user selects the strong power generation mode via the I/F unit 42. In the strong power generation mode, however, the rotational speed of the engine 2 is increased, and the fuel economy may be deteriorated. Also, if the engine 2 is driven at a high rotational speed, noise may create a problem for the environment. Since the engine 2 is driven in a condition where the vehicle 100 is stopped, exhaust gas emitted from the engine 2 may undesirably fill the surroundings of the vehicle 100. Thus, when the user wishes to reduce fuel consumption, noise and exhaust gas, the user selects the weak power reduction mode via the I/F unit 42. As a result, the rotational speed of the engine 2 is reduced to be lower than that in the strong power generation mode, and the fuel consumption, noise, and exhaust gas can be reduced, as compared with those in the strong power generation mode.

Electric power from the motor-generator 5 for power generation generally depends on the rotational speed of the motor-generator 5, in other words, the rotational speed of the engine 2. In either of the weak power generation mode and the strong power generation mode, it is desirable, in principle, to drive the engine 2 at an operating point having the highest efficiency (the highest fuel efficiency) to provide the required power in each mode. Meanwhile, when the required electric power from the motor-generator 5 for power generation is larger than electric power that can be generated by the motor-generator 5 when the engine 2 is driven at the above operating point, it is possible to increase the power from the motor-generator 5, by increasing the rotational speed of the engine 2, while sacrificing the power generation efficiency to some extent.

Also, in the example of FIG. 3, the amount of electric power from the motor-generator 5 for power generation is almost constant, while the engine 2 is driven and power is generated by the motor-generator 5. However, the manner of driving the engine 2 is not limited to this.

For example, in a period in which both the power from the external power supply 80 and the power from the motor-generator 5 for power generation are used, during external charging, the engine 2 is driven, so that the power of the motor-generator 5 is maximized within a permissible range, or under a condition that the power generation efficiency is optimized. Then, when it becomes possible to obtain the remaining charging power required to bring the power storage device 7 into the full charge state, solely by use of the power from the external power supply 80, the engine 2 may be stopped in the middle of external charging, and thereafter, the power storage device 7 may be charged solely with the power from the external power supply 80. In this manner, the drive time of the engine 2 can be shortened, and emission of exhaust gas and generation of noise over a long period of time can be curbed or prevented.

Also, the power storage device 7 may be charged with electric power from the motor-generator 5 for power generation, such that the power is increased by increasing the rotational speed of the engine 2, only for a given period of time during add-on charging in the middle of external charging. In this manner, a balance between the fuel consumption efficiency and the charging time can be selected, so that charging can be performed so as to further meet the user's request.

In the vehicle 100 according to the embodiment, during add-on charging in the middle of external charging, the add-on charging may be allowed to be finished according to a request from the user. For example, when the user does not want fuel to be consumed by driving the engine 2 while add-on charging is being performed during external charging, the user can finish the add-on charging, and select, via the I/F unit 42, a mode of external charging only, in which the power storage device 7 is charged solely with electric power from the external power supply 80.

In the vehicle 100 according to the embodiment, it is not necessarily essential to perform add-on charging during external charging. For example, when the user does not want fuel to be consumed to drive the engine 2 so as to cause the motor-generator 5 for power generation to generate electric power, the power storage device 7 may be charged using only electric power from the external power supply 80. To this end, in the vehicle 100 according to the embodiment, two or more modes may be provided in advance, depending on whether add-on charging is performed during external charging, and the user may be able to select, via the I/F unit 42, a mode (mode of external charging only) in which the power storage device 7 is charged solely with electric power from the external power supply 80, or a mode (add-on charging mode) in which the power storage device 7 is charged with both the power from the external power supply 80 and power from the motor-generator 5 for power generation.

In the vehicle 100 according to the embodiment, when the remaining amount of the fuel for driving the engine 2 in the fuel tank 3 is equal to or larger than a predetermined amount, the motor-generator 5 for power generation may be permitted to generate electric power during external charging. This makes it possible to reduce fuel consumption, and secure the predetermined amount of fuel.

In the vehicle 100 according to the embodiment, an accessory power supply (ACC power supply) of the vehicle 100 may be turned on, during external charging (namely, the vehicle ECU 1 may permit the accessory power supply of the vehicle 100 to be turned on during external charging). With the accessory power supply (ACC power supply) thus turned on, comfortable equipment, such as air-conditioning equipment 21 (see FIG. 1) and audio equipment 22 (see FIG. 1), can be used, during external charging, so as to make the user in the interior of the vehicle 100 more comfortable.

In the vehicle 100 according to the embodiment, the motor-generator 5 for power generation can generate electric power during external charging, while the ignition power supply of the vehicle 100 is in the OFF state (namely, the vehicle ECU 1 may permit a generator to generate electric power during external charging, while the ignition power supply of the vehicle 100 is in the OFF state). With this arrangement, the engine 2 is not driven except when add-on charging is performed, during external charging; therefore, fuel consumption can be reduced, and unintentional driving of the engine 2 can be curbed or prevented.

Figure 4:
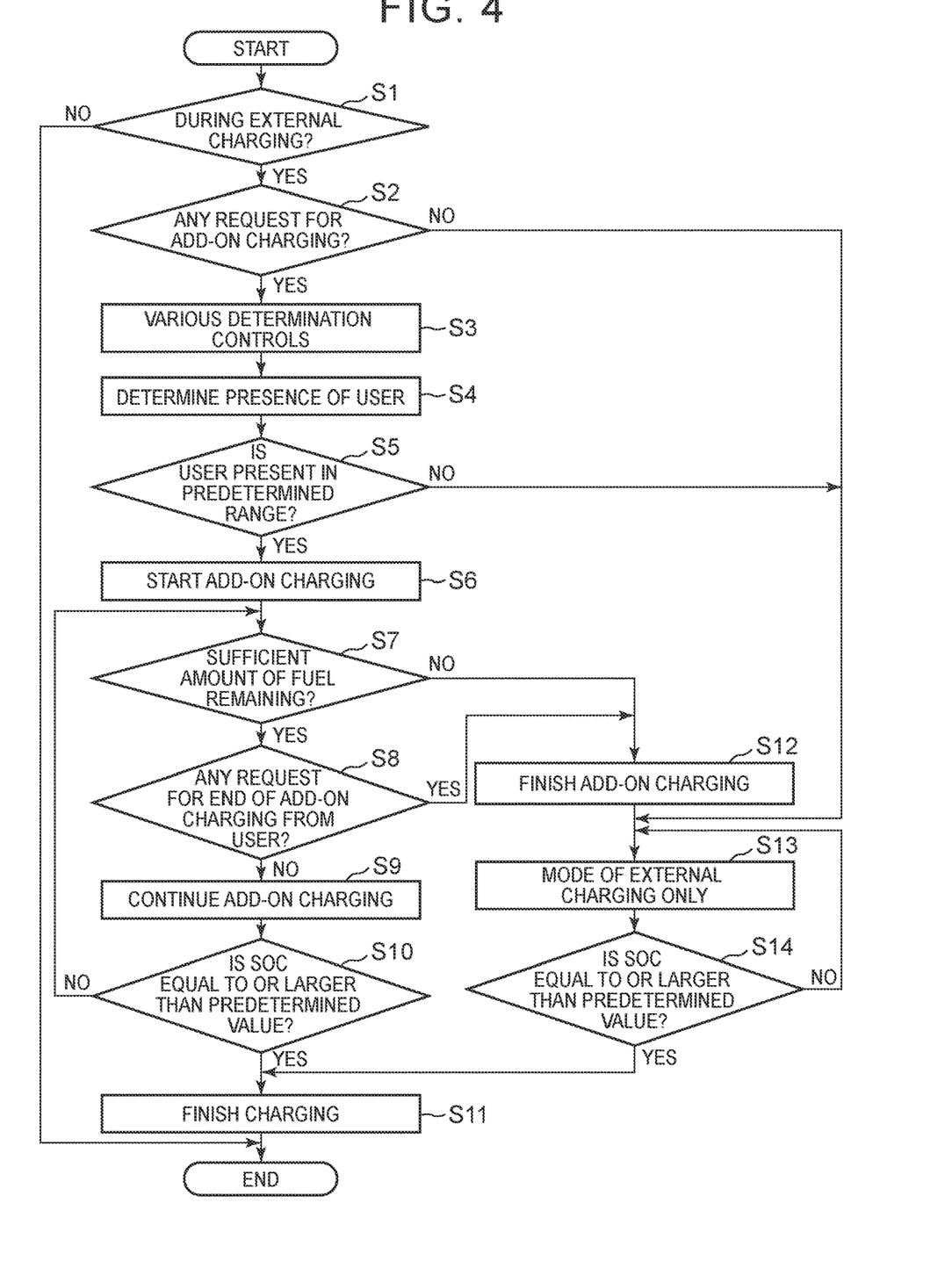
FIG. 4 is a flowchart illustrating one example of charge control performed by a vehicle electronic control unit.

FIG. 4 is a flowchart illustrating one example of charge control performed by the vehicle ECU 1. Initially, the vehicle ECU 1 determines whether external charging is being performed (step S1). In this step, the vehicle ECU 1 can determine whether external charging is being performed, based on a control signal from the charging device 9, for example. When external charging is not being performed (NO in step S1), the vehicle ECU 1 finishes the control routine of FIG. 4. On the other hand, when external charging is being performed (YES in step S1), the vehicle ECU 1 determines whether there is a request for add-on charging (step S2). The determination as to the presence or absence of the request for add-on charging can be made, based on the result of selection of the user via the I/F unit 42, about the request for add-on charging.

When the vehicle ECU 1 determines the presence of the request for add-on charging (YES in step S2), it starts various determination controls (step S3). Initially, the vehicle ECU 1 determines the presence of the user (step S4). When the vehicle ECU 1 determines that the user of the vehicle 100 is present within a predetermined range (YES in step S5), it starts add-on charging (step S6). Then, the vehicle ECU 1 determines whether there is a sufficient remaining amount of fuel for driving the engine 2 (step S7). When the vehicle ECU 1 determines that there is a sufficient remaining amount of fuel (YES in step S7), it determines whether there is a request for the end of add-on charging from the user (step S8). The determination as to the presence or absence of the request for the end of add-on charging from the user can be made, based on whether the user has selected the end of add-on charging via the I/F unit 42, for example.

When the vehicle ECU 1 determines that there is no request for the end of add-on charging from the user (NO in step S8), it continues add-on charging (step S9). Then, the vehicle ECU 1 determines whether the SOC of the power storage device 7 is equal to or larger than a predetermined value (step S10). When the vehicle ECU 1 determines that the SOC of the power storage device 7 is not equal to or larger than the predetermined value (NO in step S10), it returns to step S7. On the other hand, when the vehicle ECU 1 determines that the SOC of the power storage device 7 is equal to or larger than the predetermined value (YES in step S10), it finishes charging (step S11), and finishes the control routine of FIG. 4.

When the vehicle ECU 1 determines in step S2 that there is no request for add-on charging (NO in step S2), or when it determines in step S5 that the user is not present within the predetermined range (NO in step S5), the vehicle ECU 1 executes the mode of external charging only (step S13).

Also, when the vehicle ECU 1 determines in step S7 that there is not a sufficient remaining amount of fuel (NO in step S7), or when it determines in step S8 that there is a request for the end of add-on charging from the user (YES in step S8), the vehicle ECU 1 finishes add-on charging (step S12), and executes the mode of external charging only (step S13).

Then, after executing step S13, the vehicle ECU 1 determines whether the SOC of the power storage device 7 is equal to or larger than the predetermined value (step S14). When the vehicle ECU 1 determines that the SOC of the power storage device 7 is not equal to or larger than the predetermined value (NO in step S14), it returns to step S13. On the other hand, when the vehicle ECU 1 determines that the SOC of the power storage device 7 is equal to or larger than the predetermined value (YES in step S14), it finishes charging (step S11), and finishes the control routine of FIG. 4.

As described above, in the vehicle 100 according to the embodiment, the engine 2 is driven so as to cause the motor-generator 5 for power generation to generate electric power, during external charging, so that the power storage device 7 can be charged with both electric power from the external power supply 80 and electric power from the motor-generator 5. Thus, the charging time can be reduced, as compared with the case where the power storage device 7 is charged solely with the power from the external power supply 80.

Also, in the vehicle 100 according to the embodiment, add-on charging can be performed during external charging, when the user is present within the predetermined range relative to the vehicle 100, namely, under a situation where the user can take action in response to an abnormality in the vehicle 100, which occurs during add-on charging in the middle of external charging. Also, add-on charging is not performed during external charging, when the user is not present within the predetermined range. Thus, the user is able to take action at the time of emergency and manage the safety of the vehicle 100, when add-on charging is performed during external charging.

What is claimed is:

1. A charge control system for a vehicle, the charge control system being configured to control charging of a power storage device of the vehicle, the power storage device being adapted to be externally charged with electric power from an outside of the vehicle, and adapted to be charged with electric power generated by a generator that is driven with driving force from an internal combustion engine, the charge control system comprising:
   a user detector configured to determine whether a user is present within a predetermined range relative to the vehicle; and
   a vehicle electronic control unit configured to permit the power storage device to be charged with electric power generated by the generator, in addition to the electric power from the outside of the vehicle, during external charging, when the user detector determines that the user is present within the predetermined range, the vehicle electronic control unit being configured to inhibit power generation by the generator during external charging when the user detector determines that the user is not present within the predetermined range.

2. The charge control system according to claim 1, wherein the predetermined range is a range that surrounds a periphery of a driver seat of the vehicle.

3. The charge control system according to claim 1, wherein the predetermined range is an interior of the vehicle.

4. The charge control system according to claim 1, wherein the predetermined range is a range in which wireless communications between the vehicle and a communication device carried by the user are possible.

5. The charge control system according to claim 1, wherein whether electric power is generated by the generator during external charging is selectable by the user.

6. The charge control system according to claim 1, wherein an amount of electric power generated by the generator during external charging is selectable by the user.

7. The charge control system according to claim 1, wherein the vehicle electronic control unit permits the generator to generate electric power during external charging, when a remaining amount of fuel for driving the internal combustion engine in the vehicle is equal to or larger than a predetermined amount.

8. The charge control system according to claim 1, wherein whether power generation by the generator during external charging is continued or finished is selectable by the user.

9. The charge control system according to claim 1, further comprising a display device that indicates that the internal combustion engine is being driven during external charging.

10. The charge control system according to claim 1, wherein the vehicle electronic control unit permits an accessory power supply to be turned on during external charging.

11. The charge control system according to claim 1, wherein the vehicle electronic control unit permits the generator to generate electric power during external charging while an ignition power supply of the vehicle is in an OFF state.

* * * * *